United States Patent [19]

Teich

[11] Patent Number: 4,640,522
[45] Date of Patent: Feb. 3, 1987

[54] DRAFT LINK SWAY BLOCK

[75] Inventor: Christian M. Teich, Mannheim, Fed. Rep. of Germany

[73] Assignee: Deere & Company, Moline, Ill.

[21] Appl. No.: 857,384

[22] Filed: Apr. 21, 1986

Related U.S. Application Data

[63] Continuation of Ser. No. 615,861, May 31, 1984, abandoned.

[30] Foreign Application Priority Data

Jun. 23, 1983 [DE] Fed. Rep. of Germany ....... 3322551

[51] Int. Cl.$^4$ .......................... A01B 59/41; B60D 7/00
[52] U.S. Cl. ................................ 280/460 A; 172/450; 280/461 A; 280/474
[58] Field of Search ........... 280/460 A, 461 A, 446 B, 280/474, 497; 172/450, 446

[56] References Cited

U.S. PATENT DOCUMENTS

| | | | |
|---|---|---|---|
| 2,935,147 | 5/1960 | Edman et al. | 172/450 |
| 3,047,076 | 7/1962 | Wier et al. | 172/450 |
| 3,627,060 | 12/1971 | Lemmon | 280/474 X |
| 3,721,302 | 3/1973 | Buchmuller et al. | 280/474 X |

FOREIGN PATENT DOCUMENTS 2216652 10/1973 Fed. Rep. of Germany ...... 172/450

Primary Examiner—John J. Love
Assistant Examiner—Mitchell J. Hill

[57] ABSTRACT

An adapter for prevention of side-to-side movement of the lower control rods or draft links of a tractor has different wall thicknesses suitable to determine the distance from the draft link to a sliding bracket fastened to the tractor over the entire range of vertical swing of the draft link, for example, for the dimensions of Classes I and II or of II and III, so that the draft link can either swing horizontally or remain horizontally fixed with respect to the sliding bracket.

11 Claims, 22 Drawing Figures

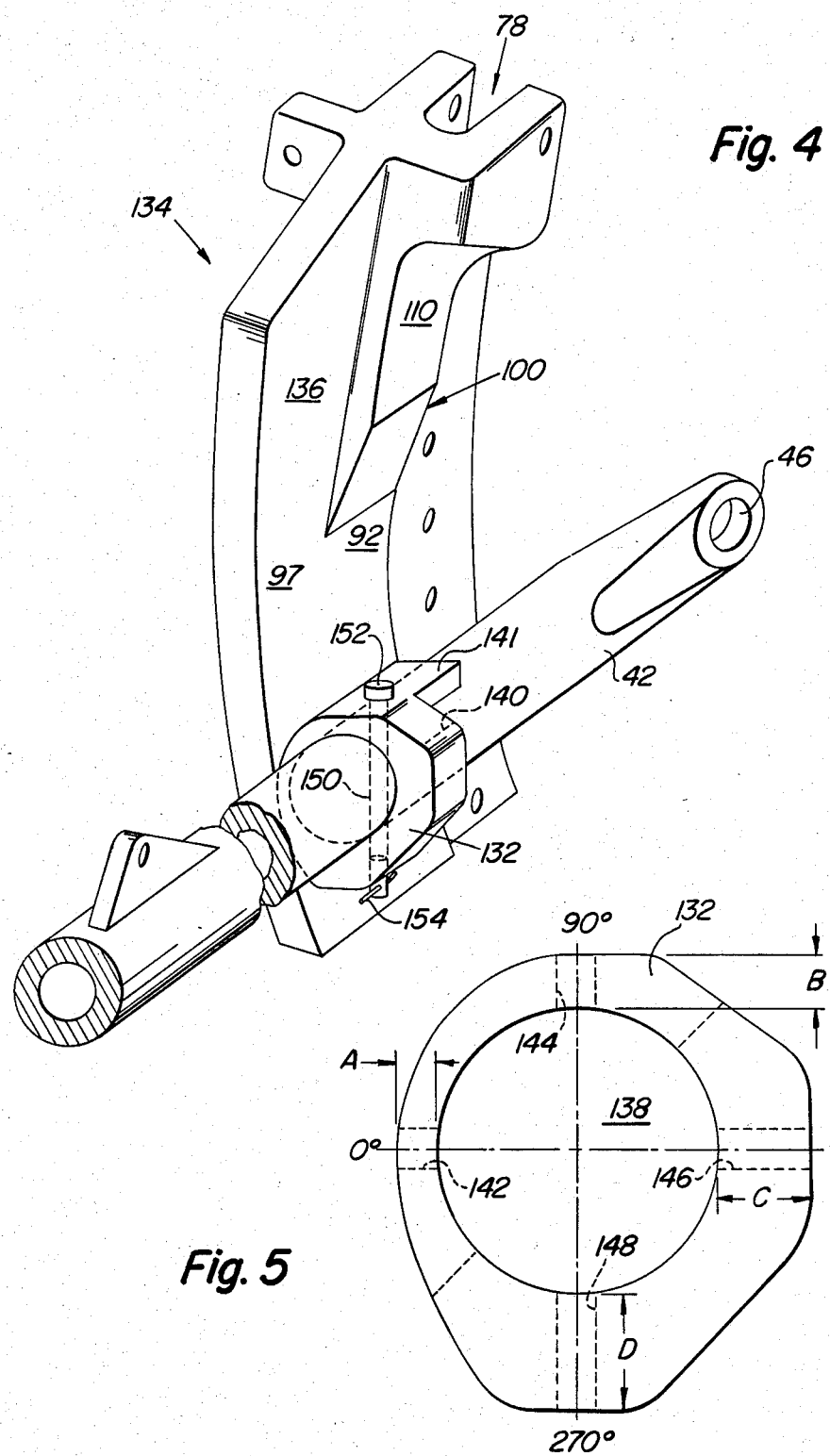

Fig. 7a    Fig. 8a    Fig. 9a    Fig. 10a
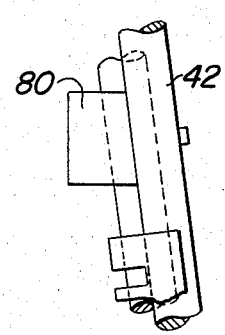 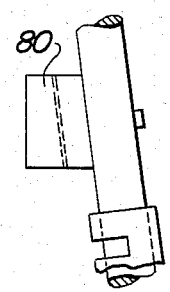 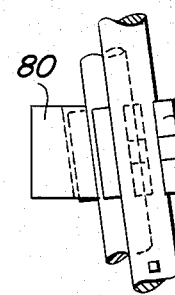 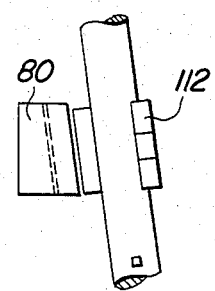
Fig. 7b    Fig. 8b    Fig. 9b    Fig. 10b
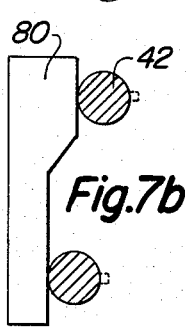 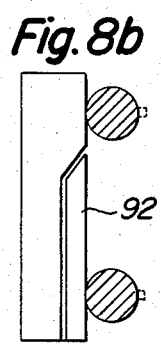 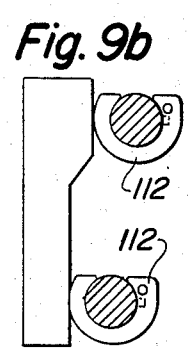 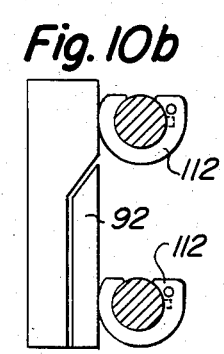
Fig. 11a   Fig. 12a   Fig. 13a   Fig. 14a
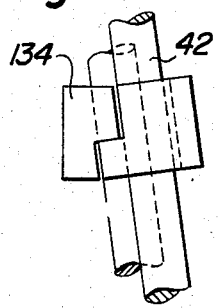 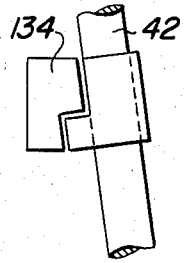 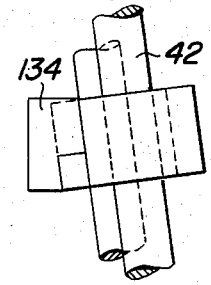 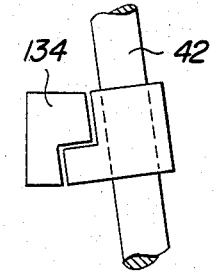
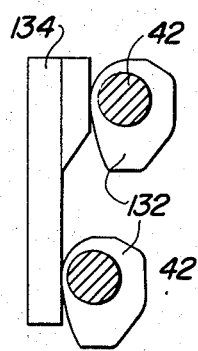 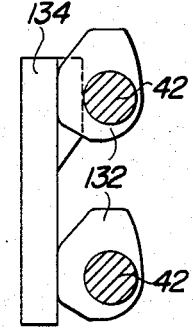 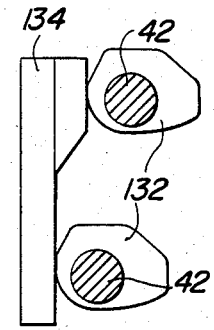 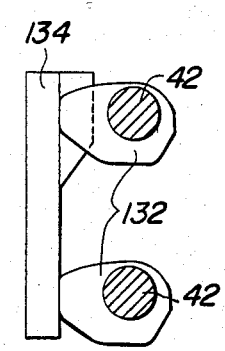
Fig. 11b   Fig. 12b   Fig. 13b   Fig. 14b

DRAFT LINK SWAY BLOCK

This application is a continuation of application Ser. No. 615,861, filed May 31, 1984 now abandoned.

BACKGROUND OF THE INVENTION

The present invention relates to a draft link sway control device.

A sway adapter or control device, described in U.S. Pat. No. 3,627,060, consists of two halves flexibly connected together, the halves having different wall thicknesses. One wall thickness determines the distance of the draft link from a bracket mounted on the tractor, or from the tractor itself, to the draft link when implements with wide connector dimensions are used. The other wall thickness determines the abovedescribed distance when implements with narrow connector dimensions are used. These two halves surround the draft link and are held on it by means of a clamping screw. In addition, cams mounted on the inner sides of the two halves engage into corresponding recesses on the draft link, and thus prevent rotary or axial movement of the adapter on the draft link. A disadvantage of this sway adapter is that it must be completely removed from the draft link when it is to be rotated so that one or the other wall thickness will determine the distance of the draft link from the tractor or the bracket mounted on it. After loosening the clamping screw, the adapter must be replaced on the draft link and fastened with the clamping screw. This leads to imprecise positioning due to the effects of dirt, rust and sand on the joint and the recesses in the draft links.

SUMMARY OF THE INVENTION

An object of the present invention is to provide a sway device or adapter which can be set or positioned in a simple manner.

This object is achieved, according to the invention, by making the adapter in one piece so that it is capable of being rotated or shifted on the draft link into various settings. In this way, the adapter always remains on the draft link and can be moved from one setting to another without removing it from the draft link. The adapter is fastened to the draft link in a secure manner in that it is positively connected to the draft link by means of a recess which receives lugs projecting from the draft link.

Preferably, the adapter is in the form of a ring which is open on one side and which has an end adjacent the opening in which a recess is formed to receive a lug or a retaining element mounted on the draft link. The end of the adapter, which includes the recess, has the form of a fork.

The adapter and draft link may be bored to accept a locking pin for connecting the adapter to the draft link. Installation of the adapter on the draft link is made possible by the fact that the width of the opening on the open side corresponds to the width of the retaining lug and to the width of one end of the draft link.

Preferably, the draft link has an additional retaining lug for an additional setting and the adapter has end surfaces which are tangential to the draft link so that the free space between the draft links is not limited by the adapter when it is coupled to the additional retaining lug.

The adapter can be fastened on the draft link in at least four different settings, whereby each of these settings is associated with a different wall thickness, first for free swinging in a lower region for implements with narrow connector dimensions, a second wall thickness for free swinging in the lower region for implements with wide connector dimensions, a third wall thickness for prevention of swinging in the lower and in an upper region for implements with narrow connector dimensions and a fourth wall thickness for prevention of swinging in the lower and the upper regions for implements with wide connector dimensions.

A bracket with front and rear, nearly vertical sliding surfaces may be attached to the tractor and the adapter may have first and second portions with different axial dimensions. Preferably, the first portion has an axial dimension which corresponds to the width of one of the sliding surfaces, while the second portion has an axial dimension which corresponds to the combined width of both sliding surfaces.

BRIEF DESCRIPTION OF THE DRAWINGS

FIG. 4 shows a second embodiment of this invention mounted on a draft link.

FIG. 5 shows a front view of the second embodiment of the invention.

FIGS. 7-10 show schematic representations of the working positions possible with the embodiment of FIGS. 2 and 3.

FIGS. 11-14 show schematic representations of the working positions possible with the embodiment of FIGS. 4 and 5.

DETAILED DESCRIPTION

Figure 1:
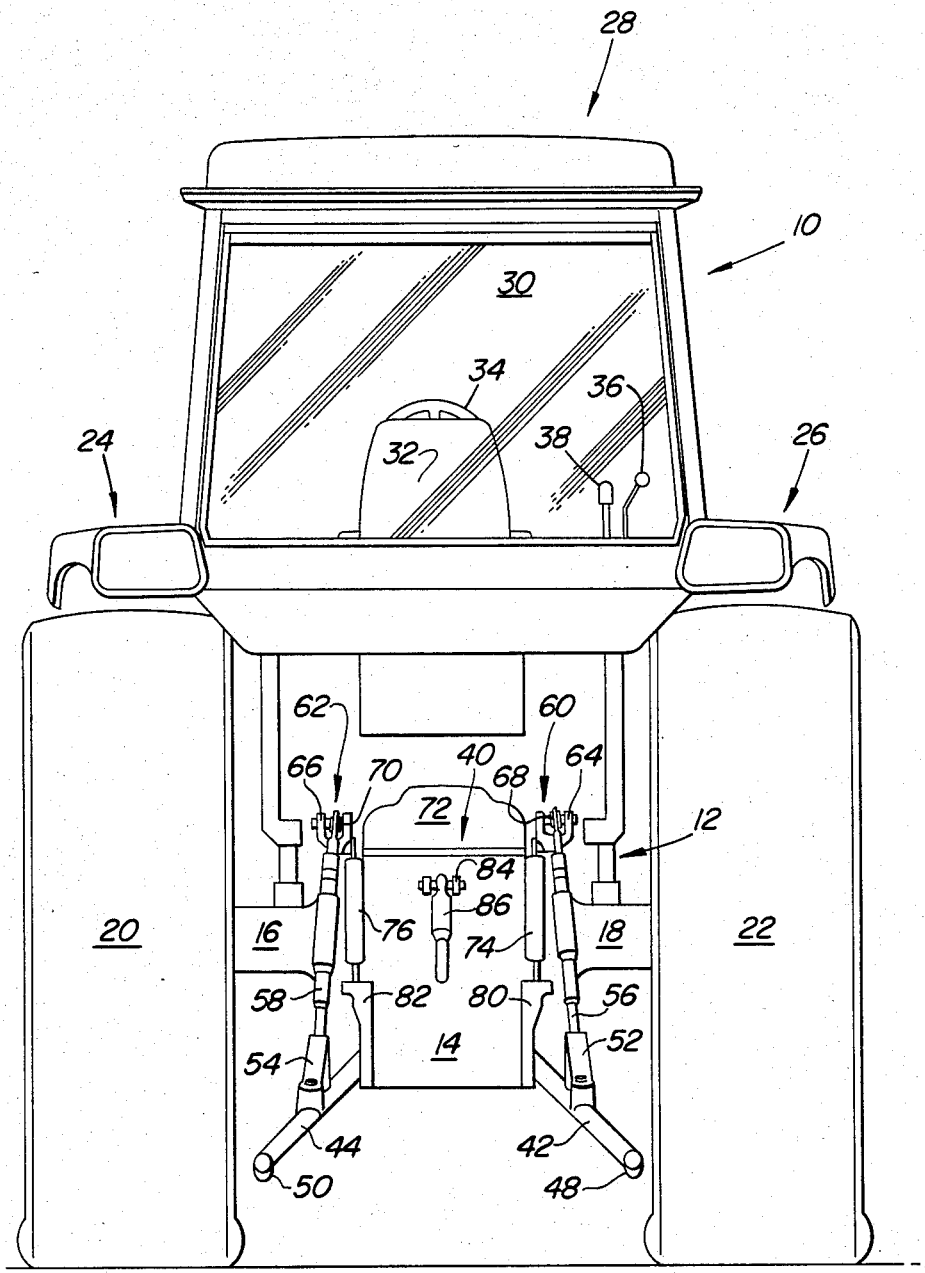
FIG. 1 shows a rear view of a tractor.

In FIG. 1, there is shown from the rear a chassis 12 of a tractor 10 consisting of a transmission housing 14 and the attached axle housings 16, 18. In the axle housings 16 and 18 are mounted wheels 20, 22 which can be turned by shafts (not shown) whereby the wheels 20, 22 are shielded from above by covers 24, 26 that can be either parts of a cabin 28 or parts fastened to it. Through the rear window 30 of the cabin 28, we can see, in the interior of the cabin, primarily a driver's seat 32, a steering wheel 34 and operating levers 36 and 38 for a transmission (not shown) and a hydraulically activated three-point hitch 40.

The three-point hitch includes right and left lower control rods or draft links 42, 44 with circular cross sections which are flexibly connected at their forward ends by means of a ball and socket joint 46, (FIG. 3 and FIG. 4), to the ends (not shown) of a bending rod extending through the transmission housing 14 perpendicular to the long axis of the tractor. Each of the draft links 42, 44 has, on its rearward end, connectors 48, 50, such as a quick coupling hook or another ball and socket joint, for connection with an attachable implement (not shown). Slightly forward of each of the connectors 48, 50 are joints 52, 54, each of which flexibly holds the lower end of a lift link 56, 58. The upper ends of the respective lift links 56, 58 extend into forks 64, 66 forged or cast onto lift arms 60, 62, and are held there by bolts 68, 70. The lift arms 60, 62 are positively connected on the ends opposite the forks 64, 66 to a rock shaft which is rotated in known fashion by a lift cylinder (not shown) which operates inside a power lift housing 72. Between the fork ends and the lift link ends of the arms are auxiliary lift cylinders 74, 76 which are flexibly connected to the lift arms 60, 62 so that the lower ends of the auxiliary lift cylinders 74, 76 engage into recesses 78 (see FIG. 2) provided in brackets 80, 82. Brackets 80, 82 are flanged onto the transmission housing 14 and are held there by pins or screws which, for the sake of simplicity, are omitted here. Finally, in the center of the transmission housing, between the two auxiliary lift cylinders 74, 76, is an upper control rod 86, of known design, held in a holder 84. Of course, instead of the above-mentioned suspension of the draft links 42, 44 from a bending rod, it is alternatively possible to suspend them on pivots fixed to the transmission housing 14, though, in that case, the upper control rod should be connected to a control device.

Figure 2:
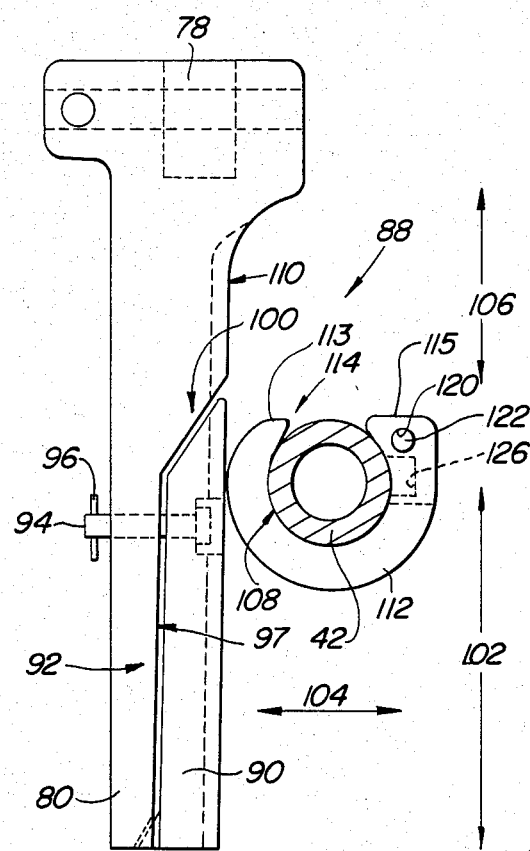
FIG. 2 shows a view of a first embodiment of this invention, viewed in the direction of the arrows of line 2—2 in FIG. 3.
Figure 3:
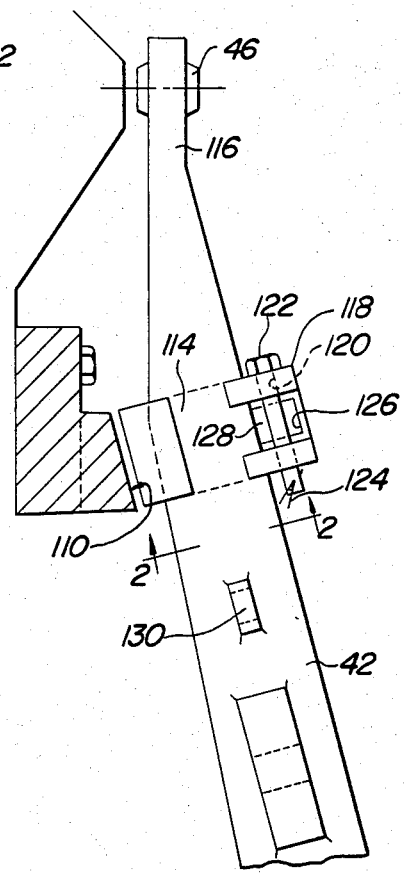
FIG. 3 shows a top view of the first embodiment mounted on a lower control rod or draft link.

Referring now to FIGS. 2 and 3, there is shown a draft link 42 mounted on the right side of the transmission housing 14 and a device 88 to limit the side-to-side motion of draft link 42. The device for limitation of the side-to-side movement of the left draft link 44 is constructed as a mirror image and therefore, a detailed description of the left side of the three-point hitch can be dispensed with.

FIG. 2 shows the bracket 80 with the recess 78 and a stop 90, which is mounted in a set-back part 92 of the bracket 80 and can be fastened there by means of a bolt 94 and a locking pin 96. The draft link 42 can be pivoted vertically over the entire length of bracket 80 by the lift link 56, in which case, it brushes past the upper stop surface 110 of bracket 80 and the stop 90 and exhibits no side-to-side movement. If the stop is removed by removing the bolt 94, then the draft link 42 can swing against a lower stop surface 97 of the bracket 80, i.e. in this region, it can move from side to side. The lower stop surface 97 blends into the upper stop surface 110 through a ramp or bevel 100 where the lower stop surface 97 corresponds to the working region and the upper stop surface 110 corresponds to the transport position. The width of the stop 90, and thus, the degree of freedom of the side-to-side movement, is dependent on standardized values.

Since the stop 90 fits flush into the set-back part 92, the bracket 80 has the same width over the entire range of swing of the lower control rod 42 after attachment of the stop 90. A system, similar to this bracket 80 and stop 90, is extensively described in German Pat. (Offenlegungsschrift No. 2,216,652). After removal of the stop 90, the lower control rod 42 can execute the motion indicated by the arrow 104 in its working position or in a lower region 102, as is required, for example, when plowing. In contrast, when it is in the transport position or in an upper region 106 on the bracket 80, a side-to-side motion, which is undesirable and dangerous during transport on account of the forces operating on the three-point hitch, is prevented.

However, if the stop 90 is mounted, the draft link 42, with an implement mounted on it, can execute only a vertical and not a horizontal motion, assuming that it touches or almost touches the upper stop surface 110 of the brackets 80, 82 with its inner side 108, when in its transport position.

It is assumed that this requirement is fulfilled, for example, with the use of implements with connector dimensions corresponding to Class II. However, it is possible, in the case of tractors with a power greater than 66 kW, to attach an apparatus with greater connector dimensions than those of Class II. Then, although the three-point hitch 40 of the tractor 10 is designed according to the connector dimensions of Class II, the draft links 42, 44 can undergo a side-to-side motion even in their transport position. This side-to-side motion can amount to the difference between the draft link separations of Classes II and III, as measured at the brackets 80 and 82. In order to avoid side-to-side play when changing to a larger class, an adapter or sway block 112, according to the invention, is therefore placed on the draft link 42. The adapter 112 is shaped like a ring with an opening 114 on one side separating ends 113 and 115. This adapter 112 has a wall thickness in the region next to the bracket 80 that corresponds to at least half the difference between the distances between the inner sides 108 of the draft links 42, 44 for Classes II and III, measured at the brackets 80, 82. On the one hand, the opening 114 serves to permit the adapter 112 to be pushed over a narrowed section of the draft link. At one end 115, the adapter 112 has a recess 126 which forms a fork 118 that is penetrated in the direction of the long axis of the draft link 42 by a bore 120 to accept a locking pin 122 which is held in the axial direction by a split pin 124. Catches or lugs 128 and 130 are fixed to the draft links 42 for a first position or operating position and for a second position or non-operating position.

Each of catches 128 or 130 can fit into the recess 126 of the fork 118. The bore 120 is located in the fork 118 so that when the locking pin 122 is inserted, the adapter 112 is held more or less without play on the draft link 42 by the corresponding catch 128 or 130. The catch 128 for the operating position is located so that when the adapter 112 is dismounted, the degree of freedom of the draft link 42 is not affected and when the adapter 112 is mounted, the desired wall thickness comes to lie against the console 80. The catch 130 for the non-operating position is arranged so that in the non-operating position of the adapter 112, the free space between the inner sides 108 of the draft links 42, 44 is not limited, i.e., the adapter 112 has its opening 114 against the bracket 80. The opening 114 is shaped so that the surfaces of ends 113 and 115 are tangential to the draft link 42. If there is sufficient free space on the draft link 42, the adapter 112 need not have tangential ends, but may have a lesser radial dimension in the region turned toward the bracket or be made with uniform wall thickness. The catch 130 for the non-operating position is, in that case, axially removed from the catch 128 for the operating position by at least one adapter width. The width or axial dimension of the adapter 112 should correspond approximately to the width of the stop surface 97 or the bracket 80.

From FIGS. 2 and 3, it can be seen that in order to be used in the operating position, if it is not already on the draft link 42, the adapter 112 must first be placed onto the draft link 42 over the neck 116, possibly turned so that it can be slid to the rear past the catch 128, and turned back again until it engages the catch with the recess 126 so that finally, it can be secured with the locking pin 122. If the adapter 112 is not needed in the operating position, then it can be brought into its non-operating position by turning it, after removal of the locking pin 122, so that it is disengaged from the catch 128 for the operating position, sliding it to the rear, engaging catch 130 for the non-operating position, and securing it there. This assumes that the width of opening 114 corresponds at least to the width of the neck 116 and also to the width of the catches 128 and 130.

The adapter 112 should be dimensioned with respect to the draft link 42 so that it cannot seize or rust in place on the draft link 42 as a result of the action of dirt and water or other factors.

The use of the split pin 124, which can be a conventional folding or spring pin, with the locking pin 122, permits the operator to bring the adapter 112 into its various positions without the use of any tool. In the embodiment, the catch 128 for the operating position projects away from the bracket 80 and the catch 130 for the non-operating position is turned 90 degrees from that. In order to avoid any warping of the adapter 112, the opening 114 can be closed with a suitable segment. In such a case, the locking pin 122 can be dispensed with since the segment reaches into the recess 126 in front of the corresponding catch 128 or 130. Naturally, in that case, the segment must be suitably secured against falling out. It is also possible to arrange the adapter 112 on the draft link 42 in such a way that its opening lies on the bottom.

The catch 130 for the non-operating position is then required only when the adapter 112 remains in its non-operating position on the draft link. If the catch 130 is provided, and the adapter 112 is connected with it in its non-operating position, then in order to bring it into its operating position, the procedure is the reverse sequence of that described above.

FIGS. 4 and 5 represent a second example of a device to limit the side-to-side play of the draft links 42, 44. To the extent that the same parts are used as in the embodiment described above, the same reference numbers are also used.

In this case, a rotating adapter 132 and a sliding bracket 134 are used to limit the side-to-side play of the draft link 42. The bracket 134 is similar to bracket 80, but also has a rearward extending sliding surface 136 which extends over the entire length of the sliding bracket 134 and which, in the thickness of the sliding bracket 134 at its lower end, is formed over its entire length. As best seen in FIG. 4, the bracket 134 forms a nearly vertical, generally L-shaped sliding surface 97 with upper portion 136 and lower portion 92. As can also be clearly seen in FIG. 4, lower portion 92 is longer in the fore-and-aft direction than is upper portion 136. Ramp 100 and surface 110 are formed on a stop member which projects from bracket 134. This stop member is located forward of upper surface portion 136 and above lower surface portion 92.

The rotating adapter 132 has a lengthwise bore 138 which corresponds in diameter approximately to the outer diameter of the round draft link 42.

The rotating adapter 132 has four wall thicknesses, circumferentially spaced by 90 degrees. These wall thicknesses determine the distance of the draft link 42 or 44 to the sliding surface 136 or to the upper stop surface 110 for the transport position on the sliding bracket 134 above the set-back region 92.

A first wall thickness "A" corresponds to the minimum dimension for the rotating adapter 132 and an angle of 0 degrees. There follows, at 90 degress, a wall thickness "B" that corresponds to wall thickness "A" plus an amount corresponding to half the difference between the distance of the inner sides 108 of the draft links 42, 44 from each other for Classes II and III or Classes I and II, measured at the sliding brackets 134. At 180 degrees is wall thickness "C" which is composed of wall thickness "A" and the thickness of the set-back 92. Finally, at 270 degrees, the rotating adapter 132 has wall thickness "D" which is composed of wall thickness "C" and half the difference between the distance of the inner sides 108 of the draft links 42, 44 from each other for Classes II and III or Classes I and II, measured at the sliding bracket 134.

In the region between 135 degrees and 315 degrees, the rotating adapter 132 has an axial dimension 140 corresponding to the length of the sliding surface 136 in the long direction of the tractor. Outside of this 135–315 degree range, it has an axial dimension 141 corresponding to the entire length of the sliding bracket 134 in the long direction of the tractor, i.e. corresponding to the length of the sliding surface 136 plus the length of the set-back region 92 or the stop surface 110.

In order to stop the rotating adapter 132 on the lower control rods 42 or 44, there are holes 142, 144, 146, 148 provided at 0 degrees, 90 degrees, 180 degrees and 270 degrees, respectively, as well as a hole 150 running radially through the draft link 42 and parallel to the sliding surface 136. The holes 142 to 148 are arranged so that the pin 152 can be inserted either through holes 142 and 146 or through holes 144 and 148. It is also possible to fix the rotating adapter 132 by means of a catch and fork connection similar to the fastening of adapter 112 on the draft link 42, in which case, the hole 150 through the draft link 42 is eliminated. Other methods of fastening the adapter are also possible. The fastening of the adapter 112 in the first embodiment can also be accomplished like that of the rotating adapter 132, i.e. by means of a pin through the draft link 42 engaging suitable holes in the adapter 112.

With this adapter 132, the following four operating modes are possible without the stop 90 used in the first embodiment:

1. Free horizontal swinging of the draft link 42 is permitted only in the working position or in the lower region 102 for Class I or II by turning the rotating adapter 132 so that wall thickness "A" comes to lie between the draft link 42 and the sliding bracket 134.
2. Free horizontal swinging of the draft link 42 is permitted only in the lower region 102 for Class II or III by turning the rotating adapter 132 so that wall thickness "B" comes to lie between the draft link 42 and the sliding bracket 134.
3. Horizontal swinging of the draft link 42 is prevented in the lower and upper regions 102 and 106 or the transport position for Class I or II by turning the rotating adapter 132 so that wall thickness "C" comes to lie between the draft link 42 and the sliding bracket 134.
4. Horizontal swinging of the draft link 42 is prevented in the lower and upper regions 102 and 106 for Class II or III by turning the rotating adapter 132 so that wall thickness "D" comes to lie between the draft link 42 and the sliding bracket 134.

In the first and second operating modes, side-to-side motion of the draft link 42 is prevented in the transport position because the rotating adapter 132 extends over the entire length of the sliding bracket 134 in the long direction of the tractor, and thus, comes to rest against the stop surface 110. In the third and fourth operating modes, side-to-side motion of the draft link 42 is prevented in both the working position and the transport position 102, 106 since, due to its shorter axial dimension 140 and its greater wall thicknesses "C" and "D", the rotating adapter 132 slides on the sliding surface 136 over the entire range of swing of the draft link 42 and past the bevel 100.

Figure 6:
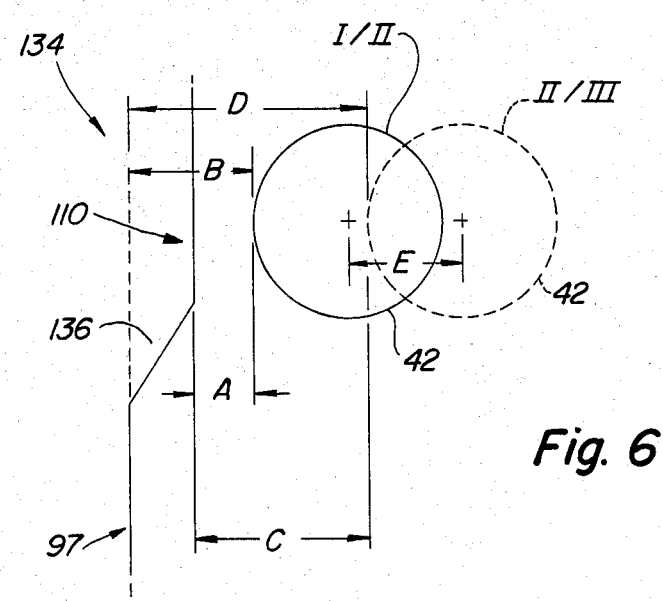
FIG. 6 shows a schematic representation of the distances between the draft link and the tractor, or a bracket installed thereon, that can be achieved with the second embodiment of the invention.

For clarification, the relation between the wall thicknesses A, B, C and D and the resulting distances of the draft link 42 from the sliding bracket 134 mounted on the tractor is schematically represented in FIG. 6. In this case, the wall thicknesses "A" and "B" correspond to the distances from the draft link 42 to the upper and the lower stop surfaces 110 and 97 of the sliding bracket 134 for Classes I and II.

The wall thicknesses "C" and "D" correspond to the distances from the draft link 42 to the stop surface 97, which extend with sliding surface 136 corresponding to the broken lines of the upper end of the sliding bracket 134, and the stop surface 110 for Classes II and III. The segment "E" corresponds to half the difference between the distances of the inner sides 108 of the draft links 42, 44 from each other for Classes II and III or Classes I and II, measured at the sliding bracket 134.

Use of the adapter 112 and of the rotating adapter 132 is not limited to use with draft links with round cross section, but is also possible with flat steel draft links. In the latter case, however, the free space to the left and right of the flat steel draft link between it and the adapter 112 or the rotating adapter 132 should be filled by axially secured arc-shaped inserts.

The various possible positions of the draft link 42 with the use of adapter 112 and rotating adapter 132 for Classes I or II are shown schematically in FIGS. 7, 8, 11 and 12 and for Classes II and III, are schematically shown in FIGS. 9, 10, 13 and 14.

The terms left, right, forward, rear, upper and lower are with reference to the forward direction of travel of the tractor.

Finally, it is noted that the selection of classes is only for purposes of illustration and the design can also be based on other dimensions of implement connections.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. An assembly for limiting sway of a draft link of a tractor comprising:
    a bracket fixed to a frame of the tractor, the bracket having a nearly vertical, generally L-shaped sliding surface with upper and lower portions, the lower portion having a longer length in the fore-and-aft direction and the upper portion having a shorter length in the fore-and-aft direction, the bracket also having a stop member projecting therefrom and located to one side of the upper surface portion and above the lower surface portion, and
    an adapter mounted on the draft link for sliding engagement with the bracket sliding surface, the adapter being rotatable and shiftable into a plurality of settings, the adapter comprising a first portion with a shorter fore-and-aft length corresponding to the shorter length of the upper portion of the bracket sliding surface and a second portion having a longer fore-and-aft length corresponding to the longer length of the lower portion of the bracket sliding surface, the second portion being engageable with the stop member when the draft link is in a transport position.

2. The invention of claim 1 wherein the adapter is in one piece and has recess for receiving a retaining lug projecting from the draft link.

3. The invention of claim 2, wherein the draft link has a further retaining lug projecting therefrom, the further retaining lug being spaced apart from the other retaining lug, each lug corresponding to a separate setting of the adapter.

4. The invention of claim 1, wherein the adapter is in the form of a ring having an opening on one side, the opening separating a pair of ends.

5. The invention of claim 4, wherein the opening between the pair of ends has a width corresponds to a width of one end of the draft link.

6. The invention of claim 4, wherein the ends have surfaces which are tangential to the draft link.

7. The invention of claim 1, wherein the adapter has an opening on one side, the opening separating a pair of ends, one end having a recess therein for receiving a lug projecting from the draft link.

8. The invention of claim 7, wherein the one end of the adapter is forked.

9. The invention of claim 1, wherein the adapter has a bore extending therethrough to receive a locking pin.

10. The invention of claim 1, wherein the adapter can be secured on the draft link in at least four different points.

11. The invention of claim 1, wherein the adapter has a first wall thickness for free swing in a lower region for implements with narrow connector dimensions, a second wall thickness for free swing in the lower region for implements with wide connector dimensions, a third wall thickness for prevention of swing in the lower region and in an upper region for implements with narrow connector dimensions and a fourth wall thickness for prevention of swing in the lower and the upper regions for implements with wide connector dimensions.

* * * * *

UNITED STATES PATENT AND TRADEMARK OFFICE
CERTIFICATE OF CORRECTION

PATENT NO. : 4,640,522

DATED : 3 February 1987

INVENTOR(S) : Michael Teich

It is certified that error appears in the above-identified patent and that said Letters Patent is hereby corrected as shown below:

Col. 8, line 19, after "has", insert -- a --.
Col. 8, line 30, after "width" insert -- that --.

Signed and Sealed this

Eleventh Day of August, 1987

Attest:

DONALD J. QUIGG

*Attesting Officer*  *Commissioner of Patents and Trademarks*